United States Patent [19]
Mercure

[11] Patent Number: 5,574,518
[45] Date of Patent: Nov. 12, 1996

[54] SYSTEM INCORPORATION TWO DIFFERENT SPHERO-NON-SPHERICAL CONTACT LENSES FOR CORRECTING PRESBYTIA

[75] Inventor: Robert Mercure, St. Denis-de-Brampton, Canada

[73] Assignee: Les Laboratoires Opti-Centre Inc., Quebec, Canada

[21] Appl. No.: 370,666

[22] Filed: Jan. 10, 1995

[51] Int. Cl.$^6$ ................................... G02C 7/04
[52] U.S. Cl. .......................................... 351/161
[58] Field of Search ............................ 351/161, 160 R, 351/160 H

[56] References Cited

U.S. PATENT DOCUMENTS

| | | | |
|---|---|---|---|
| 3,950,082 | 4/1976 | Volk | 351/161 |
| 4,418,991 | 12/1983 | Breger | 351/161 |
| 4,869,587 | 9/1989 | Breger | 351/161 |
| 5,002,382 | 3/1991 | Seidner | 351/161 |
| 5,166,712 | 11/1992 | Portney | 351/161 |
| 5,214,453 | 5/1993 | Giovanzana | 351/161 |

FOREIGN PATENT DOCUMENTS 0201231  11/1986  European Pat. Off. ............... 351/161

OTHER PUBLICATIONS

Mandell, Robert B; *Contact Lens Practice–Hard and Flexible Lenses*; Second Edition; 1974; pp. 651–655.

Primary Examiner—Georgia Y. Epps
Assistant Examiner—Jordan Schwartz
Attorney, Agent, or Firm—Fishman, Dionne & Cantor

[57] ABSTRACT

The first contact lens is placed on the dominating eye and includes a central spherical area for distance vision, which is surrounded by an annular non-spherical area having a diopter in the form of progressive addition which varies from zero addition at the inner periphery to a maximum addition at the outer periphery, and which enables vision, at all distances including reading. The second contact lens is placed on the dominated eye. The central area is spherical and adjusted for reading. The non-spherical annular area has a progressive reduction from maximum addition to zero addition, which enables vision from reading to intermediate and distance vision. This system provides in most cases 95–100% vision at all distances.

8 Claims, 2 Drawing Sheets

SYSTEM INCORPORATION TWO DIFFERENT SPHERO-NON-SPHERICAL CONTACT LENSES FOR CORRECTING PRESBYTIA

BACKGROUND OF INVENTION (a) Field of the Invention

The present invention relates to a system for correcting presbyopia. More particularly, the invention is concerned with a combination of two contact lenses where one is more specially adapted to correct distance vision and the other, reading vision. The invention is for example achieved by utilizing a system of two different sphero-non-spherical contact lenses. In other words, the present invention is directed to a system of visual correction enabling the simultaneous correction of presbyopia and myopia or hypermetropia, by means of two contact lenses of different geometry, and which are complementary to one another. One of these lenses is specifically placed on the dominating eye to assist distance vision while the other lens is disposed on the other eye to improve vision reading.

(b) Description of Prior Art

Presbyopia consists of a decrease of the accommodation power (convergence) of the crystalline lens, which prevents a person from having a good vision at close distance. This loss of accommodation of the crystalline lens affects everybody who reaches the age of 40 years and older. The loss of the accommodation power of the crystalline lens is progressive, less important at the start and is more noticeable as the years go by. It gradually becomes impossible to read a text without having a visual correction.

Presbyopia affects emmetropic eyes, i.e. which present a normal vision, as well as ametropic eyes, i.e. which present an anomaly of the ocular refraction, such as myopia, hypermetropia and astigmatism.

Accommodation, in the field of optometry, means a modification of the curvature of the crystalline lens of the eye providing a greater convergent power in order to project a clear image on the retina when the objects which are perceived are close.

Another term which needs to be defined in order to clarify the description of the present invention, is the word addition. It means a convergent increment to an optical correction to compensate for the loss of convergence (accommodation) of the crystalline lens. The increment is directly proportional to the importance of presbyopia. For example, a presbyope having a loss of accommodation equivalent to 2.00 diopters will need an addition of +2.00 diopters.

On the other hand, a myopic person whose correction for distance vision is −3.50 diopters and whose presbyopia is of 2.00 diopters, should have a correction of −3.50 diopters for distance vision and a correction of −1.50 diopter for reading, i.e. (−3.50)+(+2.00 addition)=−1.50.

A person suffering from hypermetropia whose distance vision correction is +3.50 diopters and whose presbyopia is +2.00 diopters, will need a correction of +3.50 diopters for distance vision and a correction of +5.50 diopters for reading vision, i.e. (+3.50)+(+2.00 addition)=+5.50.

An emmetropic person whose distance vision is normal and whose presbyopia is 2.00 diopters, will need no correction for distance vision but will require a correction of +2.00 diopters for reading vision, i.e. (0.00)+(+2.00 addition)=+2.00.

A diopter is a unit of measure of the vergency of optical systems which is equivalent to the vergency of an optical system whose focal distance is 1 meter. The symbol "+" is used for converging optical systems, i.e. which converge optical rays; the symbol "−" is used for diverging optical systems, i.e. which diverge optical rays.

When used in the present context, the term spherical defines the characteristic of a surface in which the points are generated by radii of curvature of identical lengths, originating from a single point. More specially, it represents the characteristic of an optical system which has one single focal point, i.e. meeting point of the optical rays. In general, a spherical optical system is generated by one or more spherical surfaces.

The term non-spherical indicates a surface in which the points are generated by radii of curvature of different lengths which originate from different points placed on the same axis. It is used in association with an optical system which has a plurality of focal points, i.e. converging point of the optical rays. In general, a non-spherical system is generated by one or more non-spherical surfaces.

Focus or focal point is the converging point of an optical system where the image is formed.

Another term which needs definition in the context of the present invention, is the expression dominating eye. It means the eye in which visual perception is predominant for distance vision. The other eye is considered to be the dominated eye. Finally, the term power means the dioptric power of a converging "+" or diverging "−" optical system.

It is known to use an optical additional correction called addition for the purpose of compensating for the loss of accommodation of the crystalline lens. The addition has a positive dioptric power (converging) of a value which is equivalent to the loss of the converging power of the crystalline lens. The means for visual correction for persons having presbyopia, in the form of spectacles are numerous and very efficient. However, the situation is different when the means of visual correction are contact lenses.

For correcting presbyopia with contact lenses, four different groups of lenses are available:

1. simple spherical lenses used in monovision;
2. bifocal lenses;
3. non-spherical lenses;
4. sphero-non-spherical lenses.

Simple spherical lenses constitute a type of correction which utilizes two spherical lenses having a single focus. The dominating eye is corrected for distance vision and the other for reading vision. This is surely the most popular way of correcting presbyopia in spite of its limitation. The reason for the popularity of this type of adjustment resides in its great simplicity and the low cost of the lenses used. With this type of adjustment, the wearer loses his binocular vision since only one of his eyes sees at a distance and only one is used for close vision. This type of vision is, at the limit, tolerable for early presbyopic people for whom the addition is less than +1.50 diopters. For the others, the loss of binocular effect becomes intolerable. The long term negative effects on visual perception have not yet been definitely established. In addition, this type of adjustment does not provide comfortable vision for objects located at intermediate distance.

There are three types of bifocal contact lens, namely segmented lenses, concentric lenses and diffractive lenses.

A segmented lens is divided into two distinct optical zones. The upper part is for correcting distance vision, and the segment constituting the lower part is for close vision, such as reading. The two optical zones have spherical surfaces.

In order to alternately use the two zones of vision, the lens must undergo a vertical displacement relative to the pupil. For this displacement to take place, the lens should rest on the edge of the lower lid and be maintained by the latter when inclining the head in reading position. This often causes a problem as a person gets older, since the tonus of the lower lid substantially decreases which causes the lens to slide under the lid, thereby preventing an adequate displacement which is required when using the lower reading zone.

This type of geometry does not provide a comfortable vision at intermediate distances, since there are only two focuses and because the optical corrections are limited to close or distant objects. For example, a person working on a computer will have a good vision of the keyboard and of distant objects, however the screen will be blurred. It should be noted that this problem increases as presbyopia increases since the difference between the two corrections increases.

Concentric lenses are divided into two distinct optical zones, i.e. a central circular zone of spherical type surrounded by an annular zone which is also of spherical type. There are two versions of this basis geometry. One consists in providing the correction for distance vision in the central part of the lens and the correction for close vision, in the annular part. The other version consists in reversing the order of these corrections.

This type of geometry does not provide a comfortable vision at intermediate distances, since there are only two focuses and the optical corrections are limited to distance or close objects. For example, a person working on a computer will have a good vision of the keyboard and of remote objects, however vision of the screen will be blurred. It should be noted that this problem is aggravated with the progression of presbyopia since the difference between the two corrections increases.

This type of lens utilizes a simultaneous vision mode, i.e. the two zones of vision of the lens are used simultaneously and they are permanently before the pupil. The utilization of this type of lens for night vision often produces light reflections which disturb the visual perception mainly when driving a car. The abrupt passage (without transition) of the correction for distance vision to close vision produces a marked junction at the common limit of the two zones thereby resulting in a parasite diffraction effect of the light rays. It should be noted that the use of lenses with concentric focuses is limited to two lenses of the same version (identical) for a person wearing them.

Turning now to diffractive lenses, they are divided into a plurality of concentric circular zones and rely on the principle of diffraction to produce two distinct focuses: one for correcting distance vision and the other for close vision. This type of geometry does not provide comfortable vision at intermediate distances since there are only two focuses and the optical corrections are limited to remote or close objects. For example, a person working on a computer will have a good vision of the keyboard and of distant objects, however vision of the screen will be blurred. It should be noted that this problem increases with the progression of presbyopia since the difference between the two corrections widens.

This type of lens utilizes the simultaneous vision mode, i.e. all the vision zones of the lens are used simultaneously and they are permanently before the pupil.

With non-spherical lenses, the correction (dioptric power) changes gradually from the center for close vision towards the periphery for distance vision or vice versa. The front surface is of the non-spherical type which generates a non-spherical optical system.

This type of lens utilizes the mode of simultaneous vision, i.e. the different zones of vision of the lens are utilized simultaneously and they are permanently before the pupil. Because of its design, this type of lens includes a correction for close, intermediate and distance vision. However, the design involves an important limitation. The correction for close vision (addition) is not a variable parameter and is therefore fixed.

There is a pre-established relation between the correction for distance vision and the correction for close vision. It therefore becomes difficult do obtain a true correction simultaneously for distance and close vision. In practice, it is necessary to sacrifice the quality of vision at a given distance in favor of the other. This limitation becomes more and more disastrous with the increase of presbyopia which requires a difference of correction which is increasingly important between distance vision and close vision. At the same time a compromise which is more and more important is required between the qualities of distance and close visions.

The geometry with entirely non-spherical surfaces decreases the quality of the perceived image by provoking a loss of contrast. The retina simultaneously receives a plurality of images of a same object of which some are on focus (precise) and others are out of focus (unprecise). A superimposition of images which are simultaneously precise and unprecise results in a global unprecise image. The degree of inaccuracy of the image increases with the non-spherical aspect of the surface and the latter increases with a variation of intended optical correction, and consequently with the increase of the addition (increase of presbyopia).

There is a direct relationship between the diameter of the pupil and the variation of available power (dioptric power). Because the dioptric power of the lens varies gradually from the center towards the periphery, a larger pupil will utilize a greater variation of power, while a smaller pupil will utilize a smaller variation. The result, mainly for small pupils, is the impossibility of obtaining an adequate correction for distance or close vision. Moreover, variations of lighting conditions largely influence the diameter of the pupil and at the same time the visual performance with this type of lens.

Sphero-non-spherical lenses are formed of two optically distinct zones, i.e. a spherical circular central zone and a non-spherical annular zone surrounding the latter. This type of lens utilizes the mode of simultaneous vision, i.e. the different zones of vision of the lens are utilized simultaneously and they are permanently before the pupil.

This type of lens actually includes only lenses in which the correction for distance vision is in a central spherical zone surrounded by a non-spherical annular zone for intermediate and close vision. Reference is made to U.S. Pat. No. 5,125,729.

Many advantages are associated to this type of sphero-non-spherical design. The first advantage is that the corrections for distance and close vision are distinct and independent from one another. It is therefore possible to obtain, without limitation, the exact optical correction for distance and close vision without having to modify one to the detriment of the other.

The second advantage results from the fact that the central zone provides a higher concentration of images on focus (precise) to the retina and thus gives a global image with superior contrast (more precise) as compared to entirely non-spherical lenses. Another advantage is the fact that the non-spherical annular zone enables a correction of the vision at intermediate distances in addition to correcting close vision.

The fourth advantage is due to the fact that passing from a correction for distance correction to one for close vision is carried out gradually. There is therefore no abrupt separation at the junction of the two zones, which eliminates parasites rays in night vision especially when driving a car.

Finally, since the two zones are distinct, it is possible to vary their dimensions in addition to the correcting power. It is therefore possible to vary the diameter of the two zones as a function of the diameter of the pupil of the candidates and thus to improve the visual performance of the candidates for whom the diameter of the pupils is different from the average.

As a general rule, with sphero-non-spherical lenses, the quality of distance vision is very good. However, visual performance in close vision could be improved since it is derived from a zone in which the correction is generated by a non-spherical surface. This type of lens is therefore less precise with respect to the quality of the perceived image.

It will therefore be seen that none of the systems discussed above, give a completely satisfactory correction for a person in need of bifocal lenses. This is especially true of the various combinations of lenses discussed above.

There is therefore a need for lenses which maintain good distance vision, but at the same time improve intermediate and close visions. To Applicant's knowledge, this has not been achieved with the lenses of the prior art.

SUMMARY OF INVENTION

It is an object of the invention to provide a system of contact lenses which enables to simultaneously correct close, intermediate and distance visions.

It is another object of the present invention to provide a new approach which solves the above problems while improving intermediate vision, without generating new limitations.

It is another object of the present invention to provide a new system of contact lenses which partly relies on a type of lens already known.

In accordance with the invention, there is provided a binocular vision system for correcting presbyopia by means of sphero-non-spherical contact lenses, this system comprising the combination of the following contact lenses:

a first multifocal contact lens comprising on a front face thereof, a first central area having a spherical surface, the central circular area being dimensioned to cover about 65% to about 85% of a pupil of an eye of a person, and a first annular shaped area surrounding the first central area, having an non-spherical surface which has a dioptric power in the form of a progressive addition which varies from a zero addition at the inner periphery of the first annular shaped area to a maximum addition at the outer periphery thereof, the non-spherical area enabling vision at all distances including reading, the first central area incorporating a correction for distance vision, the first annular shaped non-spherical area incorporating gradual correction from distance correction to intermediate and reading corrections, the first multifocal contact lens being adjusted to adapt to the vision of a dominant eye of that person, a second multifocal lens comprising on a front face thereof a second central area having a spherical surface being dimensioned to cover about 45% to 70% of a pupil of another eye of the person, and a second annular shaped area surrounding the second central area, having a non-spherical surface which has a dioptric power in the form of a progressive reduction which varies from a maximum addition at the inner periphery thereof to a zero addition at the outer periphery thereof, the non-spherical area enabling vision at all distances including reading, the second central area incorporating a correction for reading, the second annular shaped area incorporating gradual correction from reading to intermediate and distance corrections, the second multifocal contact lens being adjusted to adapt to the vision of a dominated eye of that person.

In accordance with a preferred embodiment of the invention, the first multifocal contact lens comprises a third annular shaped spherical area surrounding the first annular shaped area, the third annular shaped spherical area incorporating essentially a reading correction.

In accordance with yet another embodiment of the invention, the second multifocal contact lens comprises a fourth annular shaped spherical area surrounding the second annular shaped non-spherical area, the fourth annular shaped spherical area incorporating essentially a distance correction.

In accordance with yet another preferred embodiment, the first central area has a diameter which varies between about 1.8 to 3.7 mm, and the second central area has a diameter which varies between about 1.4 to 2.9 mm.

Preferably, the first and second annular shaped non-spherical area have a outer diameter of about 3 to 7 mm depending on the diameter of the pupil and extend past the pupil, such as all around thereof by an amount between about 0.25 to 1.5 mm.

In accordance with another preferred embodiment of the invention, the third and fourth annular shaped spherical areas have outer diameter of about 7.0 and 10.0 mm.

Preferably, the first central area is dimensioned to cover about 65% to 85% of the pupil of the dominating eye, and the second central area is dimensioned to cover about 45% to 70% of the pupil of the dominated eye., and the first and second annular shaped non-spherical area extends past the pupil, for example all around thereof by about 0.25 to 1.5 mm.

BRIEF DESCRIPTION OF DRAWINGS

The invention will now be illustrated by but is not limited to the annexed drawings in which.

DESCRIPTION OF PREFERRED EMBODIMENT

With reference to the drawings, it will be seen that a system of lenses according to the invention consists of a pair of different lenses 1 and 3. Lens 1 is intended to be worn on the dominating eye, while lens 3 is for the dominated eye of a person in need of a prescription.

Figure 1:
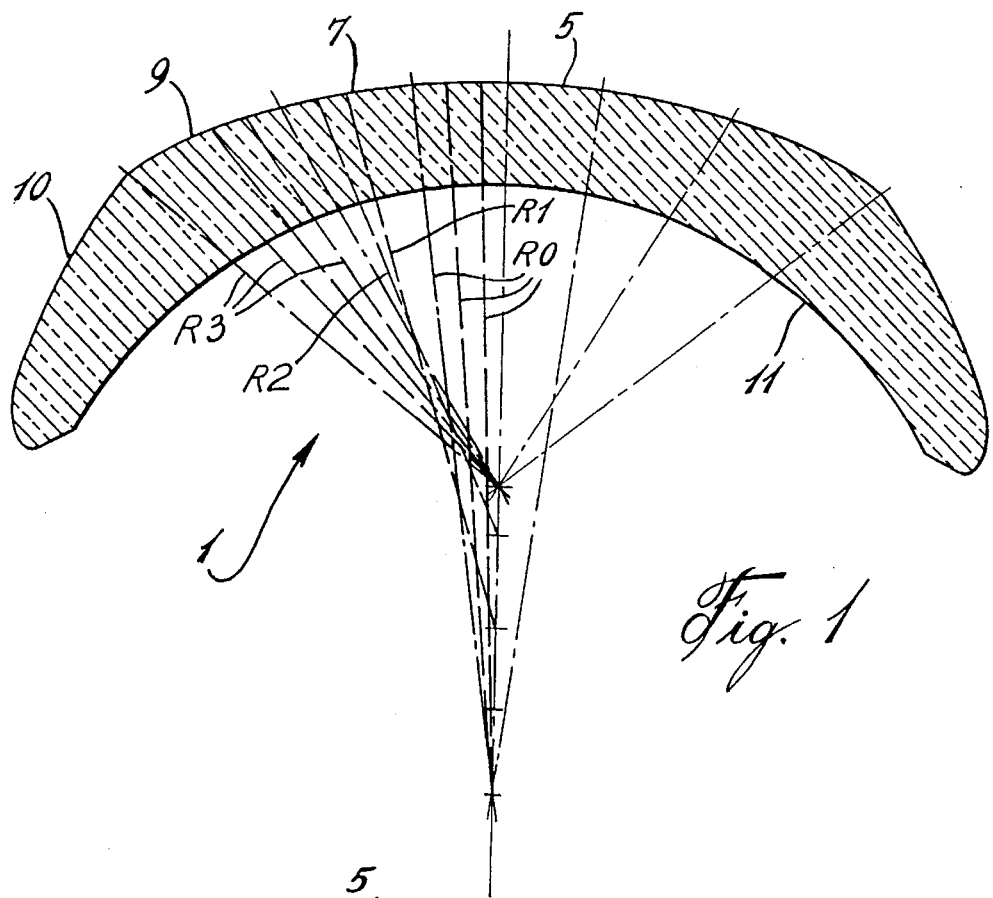
FIG. 1 is a cross-section view of a lens according to the invention which is intended to be placed on the dominating eye.
Figure 3:
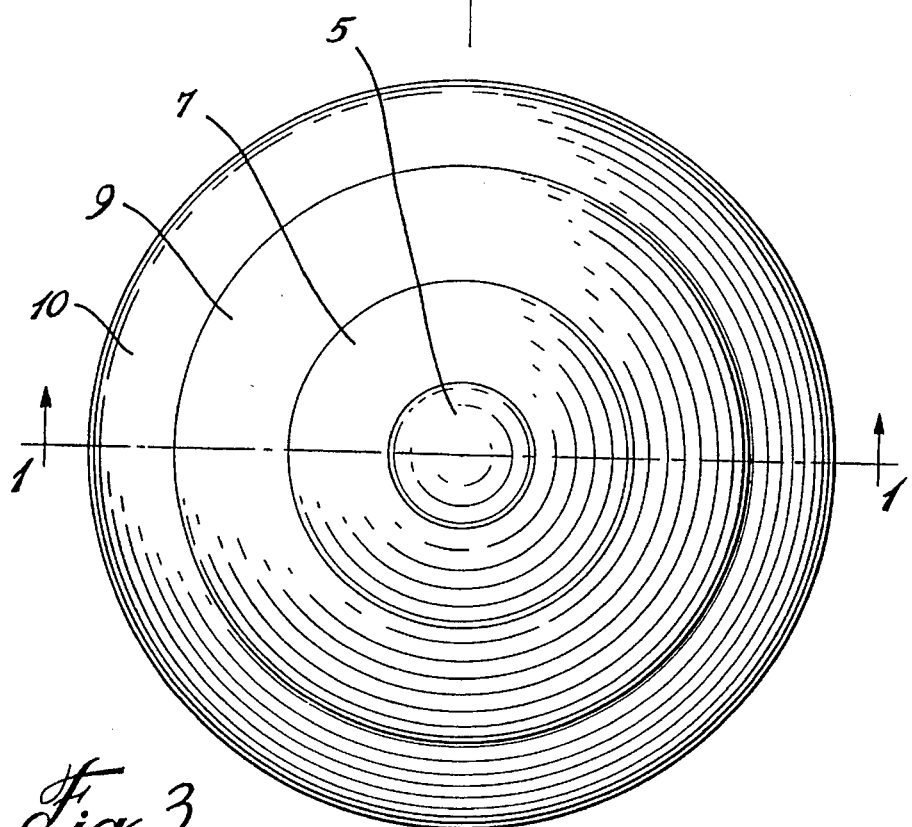
FIGS. 3 and 4 are schematic front views of the lenses illustrated in FIGS. 1 and 2.

Referring to FIG. 1, which illustrates lens 1, the latter will be seen to consist of a circular spherical central zone 5 in which is found the correction for distance vision which is needed for a particular person, the correction being dependent on the degree of curvature or dioptric power of that section of the lens. This is determined by radius $R^o$. The lens includes an annular zone 7 which is non-spherical and immediately surrounds the central zone 5. This zone 7 is destined to provide gradual corrections for intermediate and close or reading corrections. This gradual correction is ensured by gradually decreasing the radii in that zone from $R^o$ to for example $R^3$ wherein $R^o > R^1 > R^2 > R^3$. Although this is not essential, in the lens which is illustrated in FIG. 1 of the drawings, there is yet another annular zone 9, which is spherical, whose radius is $R^3$, and which surrounds annular zone 7. This zone incorporates a spherical correction for close vision only.

This lens promotes distance vision relative to close vision while enabling the latter, but with a slightly inferior quality.

The central spherical zone 5, which is of course formed on the front face of lens 1, is generated by a single radius of curvature $R^o$. This surface produces a single dioptic power (spherical). The size of this zone generally varies between 1.8 to 3.7 mm, depending on the diameter of the pupil so that it normally covers from about 65% to about 85% of the pupil The first annular non-spherical zone 7, formed also on the front surface of the lens, is generated by a multiplicity of coaxial radii of curvature $R^1$, $R^2$, $R^3$ whose lengths gradually decrease from the interior towards the exterior of the zone. This surface causes a variation of the optical correction (dioptric power). This progressive variation goes from a correction for distance correction (interior limit of the zone) to a correction for close correction (exterior limit of the zone). The interior dimension of this zone corresponds to the exterior dimension of the central zone while the exterior dimension varies from 3 to 7 mm depending on the diameter of the pupil, and in any case it preferably extends past the pupil by an amount of 0.25 to 1.5 mm on each side.

The second annular spherical zone 9, also formed on the front face of lens 1, and which surrounds annular zone 7, is generated by a single radius of curvature $R^3$. This surface produces a single dioptric power (spherical). The interior dimension of this zone 9 is equal to the exterior dimension of zone 7, while its exterior dimension varies from 7.0 to 10.0 mm depending on the diameter of the pupil and the total diameter of lens 1.

If needed, there may also be provided an outer zone 10 to properly cover the eye, as is well know to those skilled in the art.

The posterior or rear surface of the lens comprises a central spherical zone 11 and possibly one or more peripheral zones (not illustrated) which may be spherical, non-spherical or yet may have other configurations.

Figure 2:
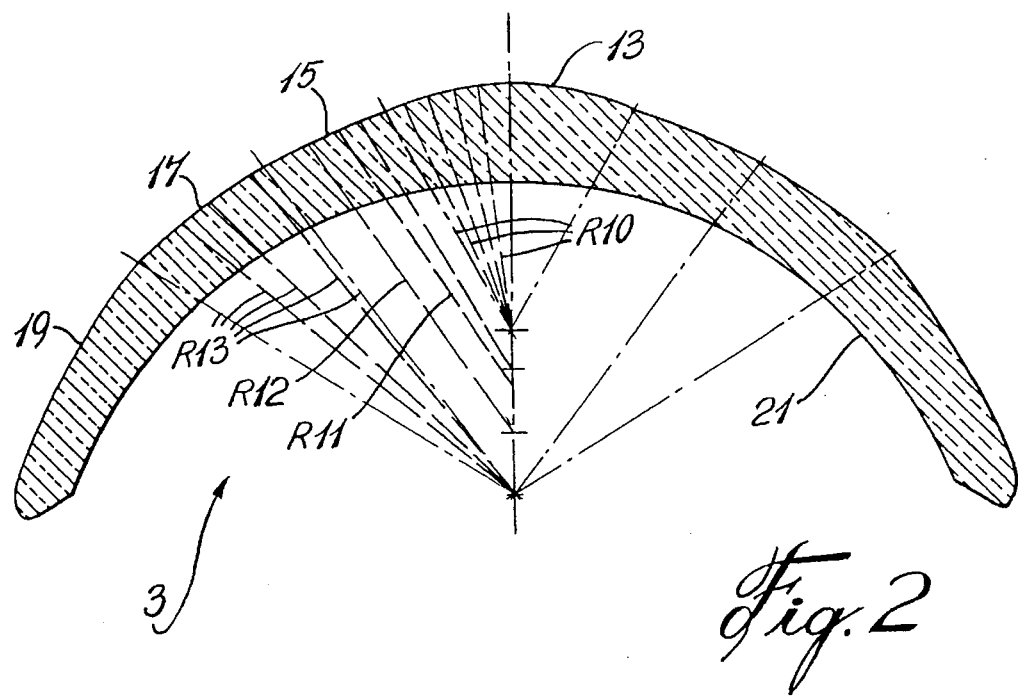
FIG. 2 is another cross-section view, showing a second lens according to the invention, to be placed on the dominated eye.
Figure 4:
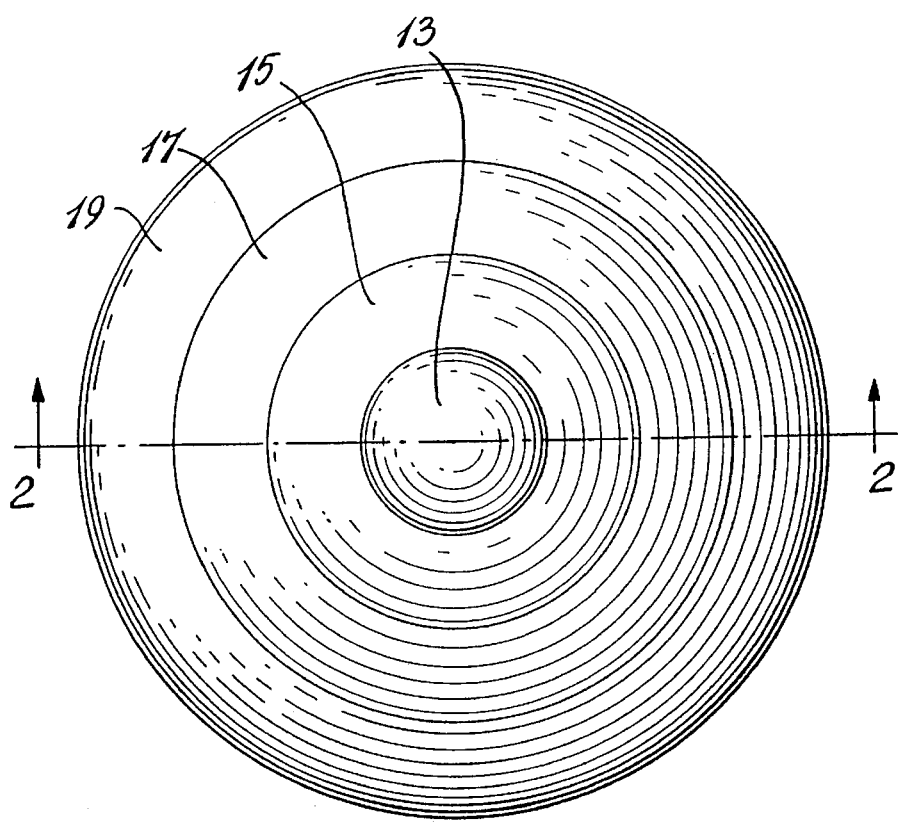

Referring now to FIG. 2, which illustrates lens 3, it will be seen that this lens has a circular spherical central zone 13 in which is found the correction for close vision. An annular non-spherical zone 15 in which are found the corrections for intermediate and distance visions, surrounds central zone 13. Finally, lens 3 comprises a second annular zone 17, which is spherical and contains a spherical correction for distance vision. This lens promotes close vision instead of distance vision while enabling the latter except with a slightly inferior quality.

The central circular spherical zone 13, on the front face of lens 3, is generated by a single radius of curvature $R^{10}$. This surface provides a single dioptric power (spherical). The dimension of that zone varies normally from 1.4 to 2.9 mm depending on the diameter of the pupil, and is selected to cover from about 45% to about 70% of the pupil.

The first non-spherical zone 15, also on the front face of lens 3, is generated by a multiplicity of coaxial radii of curvature whose length gradually increases from the interior towards the exterior of the zone. This is ensured by radii $R^{11}$ to $R^{13}$ wherein $R^{11} < R^{12} < R^{13}$. This surface provides a variation of the optical correction (dioptric power). This decreasing variation goes from a correction for close vision (interior limit of the zone) to a correction for distance correction (exterior limit of the zone). The interior dimension of zone 15 corresponds to the exterior dimension of central zone 13, while its exterior dimension varies from 3 to 7 mm depending on the diameter of the pupil, and in any case it should normally extend past the pupil by 0.25 to 1.5 on each side.

The second annular spherical zone 17, on the front face of lens 3, surrounds annular zone 15 and is generated by a single radius of curvature $R^{13}$. This surface produces a single dioptric power (spherical). The interior dimension of this zone is equal to the exterior of zone 15, and the exterior dimension varies preferably from 7.0 to 10.0 mm depending on the diameter of the pupil and the total diameter of lens 3.

If needed, there may also be provided an outer zone 19 to properly cover the eye, as is well know to those skilled in the art.

The rear face, as in the case of lens 3, has a central spherical zone referred to in this case by reference 21 and one or more peripheral zones (not illustrated) which may be spherical, non-spherical, etc.

This system of lenses utilizes the mode of simultaneous vision, i.e. the different zones of vision of the two lenses are used simultaneously and they are permanently present before the pupils. These lenses may be manufactured with a hydrophilic material or other types of material well known to those skilled in the art.

It will be realized that the corrections for distance and close visions are distinct and independent from one another. It is therefore possible to obtain an exact optical correction, without limitation, for distance and close vision without having to modify one type of vision to the detriment of the other.

Another advantage in this system of lenses, results from the fact that it provides a greater concentration of images on focus (precise) on the retina and thus gives a global image with higher contrast (more precise) as compared to lenses which are completely non-spherical. Also, the non-spherical zone enables to correct vision at intermediate distances in addition to close vision.

Since the passage from a correction for distance vision to a correction for close correction is made progressively, there is no abrupt junction at the junction between the two zones, which eliminates parasite rays in night vision mainly when driving a car.

Since the two zones, respectively 5, 7 and 13, 15 are distinct, it is possible to vary their dimensions in addition to the correction power. It is therefore possible to vary the diameter of the two zones as a function of the diameter of the pupils of the candidates thereby improving the visual performance of persons whose pupil diameters differ from the average.

With the system according to the invention, in distance binocular vision, there is a superimposition of two images which are combined by the brain. The image originating from the dominating eye is more precise since it is formed by the central spherical zone 5 of lens 1. The image of the dominated eye is less precise since it is formed by the non-spherical annular zone 15 of lens 3. The global quality of the image which is perceived is superior to the sum of the two since the better one of the two originates from the dominating eye and the brain has a certain capacity to concentrate its interpretation of the image on the one which is clearer. Moreover the larger central zone of lens 1 promotes this situation. In all cases, the difference of visual sharpness between the two eyes is sufficiently reduced, from 5% to 10%, to maintain the function of visual binocularity.

In close binocular vision, there is a superimposition of two images which are combined by the brain, similarly as for distance vision. The image originating from the dominated eye is more precise since it is formed by the central spherical zone 13 of lens 3. The image received by the dominating eye is less precise since it is formed by the non-spherical annular zone 7 of lens 1. The smaller central zone 13 of lens 3 is not penalized because of the proximity of the objects which are perceived. The global quality of the perceived image is superior to the sum of the two since the brain possesses some capacity to concentrate its interpretation of the image on the one which is clearer. In all cases, the difference of visual sharpness between the two eyes is sufficiently reduced, from 5% to 10%, to maintain the function of visual binocularity.

In binocular vision at intermediate distances, there is a superposition of two images which both originate from the non-spherical annular zones 7, 15 of lenses 1 and 3. In zone 7, lens 1 produces an increasing converging dioptric power which goes from a smaller power (in converging power "+") for distance vision, to a stronger power (in converging power "+") for close vision. In zone 15, lens 3 produces a decreasing dioptric power which goes from a stronger power (in converging power "+") for close vision to a smaller power (in converging power "+") for distance vision. Moreover, this superimposition takes place with a slight gap because the central zone of lens 1 is slightly larger than that of lens 3 and the exterior diameter of the non-spherical zone is the same in the two lenses. The superimposition of the images originating from the two zones with reverse variations, and which are slightly off set produces an important field depth which enables a comfortable and precise vision of the objects which are situated at intermediate distances between far and close.

The diameter of the pupil has a direct effect on the performance of all so called simultaneous vision lenses. It should be noted here that simultaneous correction implies that the different zones of vision of the lens are all simultaneously and permanently before the pupil.

The pupil is like the diaphragm of a camera which reacts to the intensity of the light for controlling and regularizing the intensity (quantity) of light which reaches the eye to form the image on the retina. The pupil contracts itself when the light is intense and is dilated when the light is weak. Moreover, under the same conditions, the pupil diameter varies from one person to the other.

The individual dimension of the pupil as well as its variation depending on lighting conditions are therefore to be seriously considered in the design of a system of simultaneous correction of presbyopia. The system according to the present invention takes these two characteristics of the pupil into account.

The system according to the invention includes a distinct central zone whose dimension may be chosen as a function of the average pupil diameter of each individual. It is composed of two lenses in which the correction zones are reversed with respect to one another. In a situation of very intense lighting (sunshine day) the pupil is contracted. In this case, an individual who would have two lenses with the correction zone at the center for close vision, would not have a suitable distance vision since the correction for close vision would cover nearly all his pupils. In the same limit situation, the system according to the present invention would provide an excellent distance vision, with the eye carrying a lens of type 1.

In a situation of similar lighting, an individual who would wear two lenses with the correction zone at the periphery for close vision, would not be able to read conveniently since his pupil would be too small and only his correction for distance vision would be available. In the same limit situation, the system according to the present invention would provide an excellent close vision, with the eye wearing a lens of type 3.

In the reverse situation where lighting is poor, the pupil is dilated. In this case, an individual who would wear two lenses with the correction zone at the center for close vision, would not be able to read correctly since the relative percentage of precise images on focus would be too small as compared to the unprecise images, out of focus, formed at the peripheral zone. In this situation, the system according to the invention would provide a larger surface of reading zone to the eye carrying the lens of type 1.

In the latter situation, an individual who would wear two lenses with the correction zone in periphery for close vision, would not see correctly at a distance since the relative percentage of precise images on focus would be too small with respect to the unprecise images, out of focus, originating from the peripheral zone. In the same situation, the system according to the present invention would provide a larger surface for the zone of distance vision to the eye wearing a lens of type 2.

In the extreme situations where lighting is particularly low and the pupil has a maximum dilatation, the second annular spherical zone reinforces the visual performance in close vision with lens 1 and in distance vision with lens 3.

The invention will now be illustrated by means of the following examples which are not intended to limit the scope of the present invention.

EXAMPLE 1

Case of a myopic person

| | |
|---|---|
| Correction for distance vision: | right eye: −2.75 |
| d. | (dominating eye) |
| | left eye: −2.75 |
| d. | (dominated eye) |
| Addition for reading: | +2.00 d. |
| Diameter of pupils: | 3.50 mm |

The right eye (dominating) is adjusted with a lens of type 1 having the following characteristics:

a central spherical zone of 2.60 mm diameter with a power of −2.75 diopters for correcting distance vision;

a non-spherical annular zone in which the interior diameter is 2.60 mm and the exterior diameter is 6.0 mm with a power which progressively varies from −2.75 to −0.75 diopters. The value of −0.75 is calculated by algebraic addition of the optical correction for distance vision and the addition for close vision, (−2.75)+(+2.00)=−0.75.

an annular spherical zone in which the interior diameter is 6.0 mm and the exterior diameter is 9.0 mm with a spherical power of −0.75 diopter. The left eye (dominated) is adjusted with a lens of type 2 having the following characteristics:

a central spherical zone of 2.0 mm diameter with a power of −0.75 diopter for correcting close vision; the value of −0.75 is calculated by algebraic addition of the optical correction for distance vision and the addition for close vision, (−2.75)+(+2.00)=−0.75;

an annular non-spherical zone in which the interior diameter is 2.00 mm and the exterior diameter is 6.0 mm with a power which progressively varies from −0.75 to −2.75 diopters;

a spherical annular zone in which the interior diameter is 6.0 mm and the exterior diameter is 9.0 mm with a spherical power of −2.75 diopters.

EXAMPLE 2

Case of a hypermetropic person

| Correction for distance vision | right eye: +2.75 |
| d. | (dominating eye) |
|  | left eye: +2.75 |
| d. | (dominated eye) |
| Addition for reading: | +2.00 d. |
| Diameter of pupils: | 3.50 mm |

A lens of type 1 is adjusted on the right eye (dominating), having the following characteristics:

a central spherical zone, 2.60 mm diameter, with a power of +2.75 diopters for correcting distance vision;

a non-spherical annular zone in which the interior diameter is 2.60 mm and the exterior diameter is 6.0 mm with a power which progressively varies from +2.75 to +4.75 diopters; the value of +4.75 is calculated by algebraic addition of the optical correction for distance vision and the addition for close vision, (+2.75)+(+2.00)=+4.75;

a spherical annular zone in which the interior diameter is 6.0 mm and the exterior diameter is 9.0 mm with a spherical power of +4.75 diopters.

The left eye (dominated) is adjusted with a lens of type 3 having the following characteristics:

a central spherical zone, 2.00 mm diameter, with a power of +4.75 diopters for correction close vision; the value of +4.75 is calculated by algebraic addition of the optical correction for distance vision and the addition for close vision, (+2.75)+(+2.00)=+4.75;

an annular non-spherical zone in which the interior diameter is 2.00 mm and the exterior diameter is 6.00 mm with a power which progressively varies from +4.75 to +2.75 diopters;

an annular spherical zone in which the interior diameter is 6.0 mm and the exterior diameter is 9.0 mm with a spherical power of +2.75 diopters.

EXAMPLE 3

Case of an emmetropic person

| No correction for distance vision: | right eye: +0.00 |
| d. | (dominating eye) |
|  | left eye: +0.00 |
| d. | (dominated eye) |
| Addition for reading: | +2.00 d. |
| Diameter of pupils: | 3.50 mm |

A lens of type 1 is adjusted on the right eye (dominating), which has the following characteristics:

a central spherical zone of 2.60 mm diameter with a power of +0.00 diopter for correcting distance vision;

a non-spherical annular zone in which the interior diameter is 2.60 mm and the exterior diameter is 6.00 mm with a power which progressively varies from +0.00 to +2.00 diopters; the value of +2.00 is calculated by algebraic addition of the optical correction for distance vision and the addition for close vision, (+0.00)+(+2.00)=+2.00;

a spherical annular zone in which the interior diameter is 6.00 mm and the exterior diameter is 9.00 mm with a spherical power of +2.00 diopters. The left eye (dominated) is adjusted with a lens of type 3 having the following characteristics:

a central spherical zone of 2.00 mm diameter with a power of +2.00 diopters for correcting close vision; the value of +2.00 is calculated by algebraic addition of the optical correction for distance vision and the addition for close vision, (+0.00)+(+2.00)=+2.00;

an annular non-spherical zone in which the interior diameter is 2.00 mm and the exterior diameter is 6.00 with a power which progressively varies from +2.00 to +0.00 diopter;

an annular spherical zone in which the interior diameter is 6.0 mm and the exterior diameter is 9.0 mm with a spherical power of +0.00 diopter.

The average visual performances for all these cases are the following:

| Distance vision: | |
| --- | --- |
| right eye (dominating) | 95 to 100% visual acuity |
| left eye | 90 to 95% |
| binocular | 94 to 99% |
| Close vision: | |
| right eye (dominated) | 90 to 95% visual acuity |
| left eye | 95 to 100% |
| binocular | 94 to 99% |
| Intermediate vision: | |
| binocular | 95% comfortable at all distances |

It has been clearly established that the system according to the present invention is much more flexible that those of the prior art.

I claim:

1. A binocular vision system for correcting presbyopia by means of sphero-non-spherical contact lenses, said system comprising the combination of the following contact lenses:

a first multifocal contact lens comprising on a front face thereof, a first central area having a spherical surface, said front central area being dimensioned to cover about 65% to about 85% of a pupil of an eye of a person, and having a diameter which varies between about 1.8 to 3.7 mm, and a first annular shaped area surrounding the first central area, having a non-spherical surface which has a diopter power in the form of a progressive addition which varies from a zero addition at inner periphery of said first annular shaped area to a maximum addition at outer periphery thereof, said non-spherical area enabling vision at all distances including reading, said first central area incorporating a correction for distance vision, said first annular shaped non-spherical area incorporating gradual correction from distance correction to intermediate and reading corrections, said first multifocal contact lens being adjusted to adapt to the vision of a dominant eye of said person, a second multifocal lens comprising on a front face thereof a second central area having a spherical surface being dimensioned to cover about 45% to 70% of a pupil of another eye of said person and having a diameter which varies between about 1.4 and 2.9 mm, and a second annular shaped area surrounding said second central area, having a non-spherical surface which has a diopter power in the form of a progressive reduction which varies from a maximum addition at inner periphery thereof to a zero addition at outer periphery thereof, said non-spherical area enabling vision at all distances including reading, said second central area incorporating a correction for reading, said second annular shaped area incorporating gradual correction from reading to intermediate and distance correction, said second multifocal contact lens being adjusted to adapt to the vision of a dominated eye of said person.

2. A binocular vision system according to claim 1, wherein said first multifocal contact lens comprises a third annular shaped spherical area surrounding said first annular shaped area, said third annular shaped spherical area incorporating essentially a reading correction.

3. A binocular vision system according to claim 1, wherein said second multifocal contact lens comprises a fourth annular shaped spherical area surrounding said second annular shaped non-spherical area, said fourth annular shaped spherical area incorporating essentially a distance correction.

4. A binocular vision system according to claim 1, wherein said first and second annular shaped non-spherical areas have an outer diameter of about 3 to 7 mm depending on the diameter of the pupils and extend past said pupils.

5. A binocular vision system according to claim 1, wherein said first and second annular shaped non-spherical areas extend past said pupils all around thereof by an amount between about 0.25 to 1.53 mm.

6. A binocular vision system for correcting presbyopia by means of sphero-non-spherical contact lenses, said system comprising the combination of the following contact lenses:

a first multifocal contact lens comprising on a front face thereof, a first central area having a spherical surface, said front central area being dimensioned to cover about 65% to about 85% of a pupil of an eye of a person, and a first annular shaped area surrounding the first central area, having a non-spherical surface which has a diopter power in the form of a progressive addition which varies from a zero addition at inner periphery of said first annular shaped area to a maximum addition at outer periphery thereof, said non-spherical area enabling vision at all distances including reading, said first central area incorporating a correction for distance vision, said first annular shaped non-spherical area incorporating gradual correction from distance correction to intermediate and reading corrections, said first multifocal contact lens being adjusted to adapt to the vision of a dominant eye of said person, a second multifocal lens comprising on a front face thereof a second central area having a spherical surface being dimensioned to cover about 45% to 70% of a pupil of another eye of said person, and a second annular shaped area surrounding said second central area, having a non-spherical surface which has a diopter power in the form of a progressive reduction which varies from a maximum addition at inner periphery thereof to a zero addition at outer periphery thereof, said non-spherical area enabling vision at all distances including reading, said second central area incorporating a correction for reading, said second annular shaped area incorporating gradual correction from reading to intermediate and distance correction, said second multifocal contact lens being adjusted to adapt to the vision of a dominated eye of said person, said first and second annular shaped non-spherical areas have an outer diameter of about 3 to 7 mm depending on the diameter of the pupils and extend past said pupils.

7. A binocular vision system according to claim 6, wherein said first central area has a diameter which varies between about 1.8 to 3.7 mm, and wherein said second central area has a diameter which varies between about 1.4 and 2.9.

8. A binocular vision system for correcting presbyopia by means of sphero-non-spherical contact lenses, said system comprising the combination of the following contact lenses:

a first multifocal contact lens comprising on a front face thereof, a first central area having a spherical surface, said front central area being dimensioned to cover about 65% to about 85% of a pupil of an eye of a person, and a first annular shaped area surrounding the first central area, having a non-spherical spherical surface which has a diopter power in the form of a progressive additive addition which varies from a zero addition at inner periphery of said first annular shaped area to a maximum addition at outer periphery thereof, said non-spherical area enabling vision at all distances including reading, said first central area incorporating a correction for distance vision, said first annular shaped non-spherical area incorporating gradual correction from distance correction to intermediate and reading corrections, said first multifocal contact lens being adjusted to adapt to the vision of a dominant eye of said person, a second multifocal lens comprising on a front face thereof a second central area having a spherical surface being dimensioned to cover about 45% to 70% of a pupil of another eye of said person, and a second annular shaped area surrounding said second central area, having a non-spherical surface which has a diopter power in the form of a progressive reduction which varies form a maximum addition at inner periphery thereof to a zero addition at outer periphery thereof, said non-spherical area enabling vision at all distances including reading, said second central area incorporating a correction for reading, said second annular shaped area incorporating gradual correction from reading to intermediate and distance correction, said second multifocal contact lens being adjusted to adapt to the visionof a dominated eye of said person, said first multifocal contact lens comprises a third annular shaped spherical area surrounding said first annular shaped area, said third annular shaped spherical area incorporating essentially a reading correction, said second multifocal contact lens comprises a forth annular shaped spherical area surrounding said second annular shaped non-spherical area, said forth annular shaped spherical area incorporating essentially a distance correction, said third and forth annular shaped spherical areas having outer diameters between about 7.0 and 10.0 mm.

* * * * *

UNITED STATES PATENT AND TRADEMARK OFFICE
CERTIFICATE OF CORRECTION

PATENT NO.  : 5,574,518
DATED       : Nov. 12, 1996
INVENTOR(S) : Robert Mercure It is certified that error appears in the above-identified patent and that said Letters Patent is hereby corrected as shown below: On the title page, and col. 1, lines 1-5:

Item [54], should read--  SYSTEM INCORPORATING TWO DIFFERENT SPHERO-NON-SPHERICAL CONTACT LENSES FOR CORRECTING PRESBYTIA --.

Signed and Sealed this

Twenty-fifth Day of February, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,574,518
DATED : November 12, 1996
INVENTOR(S) : Robert Mercure

It is certified that error appears in the above-identified patent and that said Letters Patent is hereby corrected as shown below:

Column 10, line 28, delete "2" and insert therefor --3--
Column 10, line 64, delete "2" and insert therefor --3--
Column 12, line 41, delete "that" and insert therefor --than--
Column 13, line 35, delete "1.53" and insert therefor --1.50--
Column 14, line 24, delete "spherical" after "non-spherical"

Signed and Sealed this

Twenty-seventh Day of March, 2001

Attest:

NICHOLAS P. GODICI

Attesting Officer

Acting Director of the United States Patent and Trademark Office